(12) United States Patent
Eisenhardt

(10) Patent No.: US 10,919,393 B2
(45) Date of Patent: Feb. 16, 2021

(54) SURGE ARRESTER AND METHOD FOR OPERATING A SURGE ARRESTER

(71) Applicant: Robert Bosch GmbH, Stuttgart (DE)

(72) Inventor: Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 14/889,641

(22) PCT Filed: Apr. 30, 2014

(86) PCT No.: PCT/EP2014/058787
§ 371 (c)(1),
(2) Date: Nov. 6, 2015

(87) PCT Pub. No.: WO2014/180722
PCT Pub. Date: Nov. 13, 2014

(65) Prior Publication Data
US 2016/0087467 A1    Mar. 24, 2016

(30) Foreign Application Priority Data

May 10, 2013   (DE) .................. 10 2013 208 602

(51) Int. Cl.
*B60L 3/00* (2019.01)
*B60L 3/04* (2006.01)
(Continued)

(52) U.S. Cl.
CPC .............. *B60L 3/0046* (2013.01); *B60L 3/04* (2013.01); *B60L 50/51* (2019.02); *B60L 53/24* (2019.02);
(Continued)

(58) Field of Classification Search
CPC ............ H02J 7/0029; H02J 2007/0037; H02J 2007/0039; H02J 7/14; H02J 7/007;
(Continued)

(56) References Cited

U.S. PATENT DOCUMENTS 3,848,156 A * 11/1974 Tolstov .................... H02H 9/04
315/36
5,637,413 A    6/1997 Fernandez et al.
(Continued)

FOREIGN PATENT DOCUMENTS

CN    2602964 Y    2/2004
DE    19617847    12/1996
(Continued)

OTHER PUBLICATIONS

International Search Report for Application No. PCT/EP2014/058787 dated Mar. 3, 2015 (English Translation, 2 pages).

*Primary Examiner* — Richard Isla
*Assistant Examiner* — Michael N Dibenedetto
(74) *Attorney, Agent, or Firm* — Michael Best & Friedrich LLP

(57) ABSTRACT

The present invention relates to a surge arrester for a charge controller of a battery. The surge arrester comprises a first voltage detector with a fixed predetermined response threshold and a second voltage detector with an adaptively adjustable voltage threshold. The voltage threshold of the second voltage detector is adapted as a function of the response of the first voltage detector.

11 Claims, 3 Drawing Sheets

(51) Int. Cl.
*B60L 58/15* (2019.01)
*B60L 53/24* (2019.01)
*B60L 50/51* (2019.01)
*H02H 9/04* (2006.01)
*H02J 7/00* (2006.01)
*H02J 7/14* (2006.01)

(52) U.S. Cl.
CPC .............. *B60L 58/15* (2019.02); *H02H 9/041* (2013.01); *H02J 7/0029* (2013.01); *H02J 7/14* (2013.01); *B60L 2240/527* (2013.01); *B60L 2240/545* (2013.01); *B60L 2240/547* (2013.01); *B60L 2240/549* (2013.01); *Y02T 10/70* (2013.01)

(58) Field of Classification Search
CPC ...... H02J 7/0072; H02J 7/0073; H02J 7/0075; H02J 7/0077; H02J 7/008; H02J 7/0081; H02J 7/0086; H02H 9/041; B60L 11/1803; B60L 11/1814; B60L 3/0046; B60L 3/04; B60L 58/15; B60L 53/24; B60L 50/51; B60L 2241/527; B60L 2241/545; B60L 2241/547; B60L 2241/549
USPC ....................................................... 320/109
See application file for complete search history.

(56) References Cited

U.S. PATENT DOCUMENTS

| | | | |
|---|---|---|---|
| 6,353,307 B1 | 3/2002 | Koelle et al. | |
| 8,222,861 B1* | 7/2012 | Pedersen | H02J 7/0036 320/108 |
| 2005/0077867 A1 | 4/2005 | Cawthorne et al. | |
| 2007/0279010 A1* | 12/2007 | Okamura | H02J 7/345 320/166 |
| 2010/0065351 A1* | 3/2010 | Ichikawa | B60L 11/1868 180/65.8 |
| 2012/0058369 A1* | 3/2012 | Beckley | H01M 2/362 429/50 |
| 2013/0338862 A1* | 12/2013 | Guerin | B60L 11/1814 701/22 |
| 2014/0217958 A1* | 8/2014 | Verdun | H02J 7/007 320/107 |
| 2015/0380952 A1* | 12/2015 | Brandt | H01M 10/441 320/119 |

FOREIGN PATENT DOCUMENTS

DE  19835316  2/2000
DE  102008025986  12/2009

* cited by examiner

SURGE ARRESTER AND METHOD FOR OPERATING A SURGE ARRESTER

BACKGROUND OF THE INVENTION

The present invention relates to a surge arrester and a method for operating a surge arrester.

Three-phase machines are used today in electrical drives for hybrid or electric vehicles. Pulse width modulated inverters are used to operate these three-phase machines. The main components of pulse width modulated inverters are an intermediate circuit capacitor and semiconductor switches in the form of power semiconductors, such as, for example, MOSFET transistors or IGBTs. In order to drive the vehicle in the motor operating mode, electrical power in the form of a direct current is withdrawn from a fraction battery and thereby discharged into the battery. The pulse width modulated inverter converts the direct current into a suitable alternating current with which the three-phase machine is operated.

In addition, the three-phase machine can also be operated as a generator, for example during deceleration of the vehicle. In so doing, the power flow reverses. An alternating current from the three-phase machine is converted into a direct current by the pulse width modulated inverter, with which direct current the battery is charged. In order not to damage the main components of the pulse width modulated inverter, a predetermined voltage upper limit must not be exceeded in the process. For that reason, every pulse width modulated inverter has a maximum voltage limit, up to which it may be operated without being damaged. High operating voltages can occur during operation, in particular in the generator operating mode. When the traction battery is being charged, the charging current has the effect of increasing the terminal voltage at the battery due to the internal resistance of the battery. The resulting battery voltage can also increase above the maximally admissible voltage limit of the pulse width modulated inverter.

Pulse width modulated inverters, which are also used to charge a battery, are therefore equipped with a surge arrester function. The German patent publication DE 198 35 316 A1 discloses a controlled rectifier bridge comprising a surge arrester. The rectifier bridge is supplied with an AC voltage from a generator. The rectifier bridge comprises a voltage protection circuit in order to prevent overvoltage peaks.

The pulse width modulated inverter can furthermore be equipped with a derating function for protecting the components. As a result, the maximally admissible battery charging current is initially reduced when a first voltage threshold has been exceeded. Thus, the voltage rise sinks when the battery is further charged. In so doing, the charging current can be reduced all the more, the higher the battery voltage rises. Upon reaching a further higher voltage threshold, the charging of the battery is completely stopped. As a result, a rise in voltage can no longer occur.

The rise in voltage when charging the battery is dependent on the internal resistance of the battery. The internal resistance of the battery is in turn dependent on numerous parameters, such as, for example, state of charge, temperature and aging condition of the battery. The characteristic values, with which the charging current is adjusted, can therefore not be optimally selected for all operating conditions. In the case of unfavorable operating conditions, it is possible that the charging current is not reduced fast enough and as a result the maximally admissible voltage limit for the components in the pulse width modulated inverter is exceeded despite the derating function. Thus, damage to the pulse width modulated inverter would also be possible in this case.

For that reason, a further independent surge arrester is generally used, which transfers the pulse width modulated inverter from the normal controlled operation into a more secure state in the event that a further voltage limit is exceeded. The charging of the battery is abruptly stopped in this secure operating mode. This independent additional surge arrester can, for example, short-circuit the terminals of the three-phase machine in the generator operating mode and thus stop a further charging of the battery.

Such a change from the normal operation to the secure state of the pulse width modulated inverter leads, however, to noticeable losses in the ride comfort in an electric vehicle. The torque applied to the shaft of the three-phase machine can no longer be controlled in the secure state. A characteristic braking torque thus occurs for the three-phase machine at a given rotational speed. In addition, the change from the secure state back into the normal operation is only possible by resetting the pulse width modulated inverter. This leads to the pulse width modulated inverter undesirably staying in the secure state for too long a time.

There is therefore a need for an improved surge arrester. The need particularly exists for a surge arrester that enables the pulse width modulated inverter to operate in the normal operating mode for as long as possible.

SUMMARY OF THE INVENTION

According to one aspect, the present invention relates to a surge arrester for a charging device comprising a first voltage detector, which is designed to detect that a first voltage threshold has been exceeded, and a second voltage detector, which is designed to detect that a second voltage threshold has been exceeded; wherein the second voltage threshold can be adapted as a function of a detection of the first voltage threshold having been exceeded.

According to another aspect, the present invention relates to a method for operating a surge arrester for a charging device comprising the steps: providing a first voltage detector which is designed to detect that a first voltage threshold has been exceeded; providing a second voltage detector which is designed to detect that a second voltage threshold has been exceeded; detecting that a first voltage threshold has been exceeded and adapting the second voltage threshold as a function of a detection of the first voltage threshold having been exceeded.

It is a concept of the present invention to adaptively adjust the voltage threshold for the response of a surge arrester. To this end, the response behavior of a further superordinate voltage detector is evaluated. If the superordinate voltage detector responds, the voltage threshold of the adaptive voltage detector is then lowered in order to prevent a further response of the superordinate voltage detector. It is furthermore possible to raise the voltage threshold of the adaptive voltage detector in order to iteratively determine an optimal voltage threshold for the adaptive voltage detector.

An advantage of the adaptive adjustment of the voltage threshold for the second voltage detector is that an optimal operating point can therefore always be set for the adaptive voltage detector. In particular, it is therefore not required to add additional safety allowances when defining the voltage thresholds in order, for example, to sufficiently take into account component tolerances or something similar.

A further advantage is that the adaptively determined voltage threshold can also then be adjusted if the internal resistance of a battery to be charged changes due to changed basic conditions, such as, for example, due to ageing.

According to one embodiment, the second voltage detector is furthermore designed to detect that a third voltage threshold has been exceeded. In a special embodiment, the third voltage threshold is adjusted as a function of a detection of the first threshold value having been exceeded. By defining this third voltage threshold, measures can already be taken between the second and the third voltage threshold which reduce a rise in voltages which occur so that dangerous surges occur less often.

According to a further embodiment, the second voltage threshold is reduced by a predetermined value if the first voltage detector detects the first voltage threshold having been exceeded. By reducing the second voltage threshold when the first voltage detector responds, the second voltage detector can gradually be adjusted such that the first voltage detector responds as seldom as possible.

According to a further embodiment, the surge arrester of the present invention further comprises a storage device which is designed to store the second and/or the third voltage threshold. By storing the adjusted voltage thresholds, these calculated values of the voltage thresholds are available at a later point in time; thus enabling the second voltage detector to be immediately operated with the new, adjusted voltage thresholds during a later initialization.

The present invention further comprises a charging device for an electrical energy storage comprising a surge arrester according to the invention.

According to a special embodiment, the charging device is furthermore designed to reduce a charging current for the electrical energy storage if the second voltage detector detects that the third voltage threshold has been exceeded.

In a further embodiment, the charging device according to the invention is supplied with electrical energy by a three-phase machine.

In an alternative embodiment, the charging device is supplied with electrical energy by a three-phase machine.

The present invention further comprises an electric vehicle comprising a charging device according to the invention.

BRIEF DESCRIPTION OF THE DRAWINGS

Further features and advantages of embodiments of the invention ensue from the following description with reference to the attached drawings.

In the drawings.

DETAILED DESCRIPTION

The drawings depicted in the figures are in part perspective depictions of elements which for reasons of clarity are not necessarily depicted to scale. Identical reference signs generally denote components of the same type or having the same function.

Figure 1:
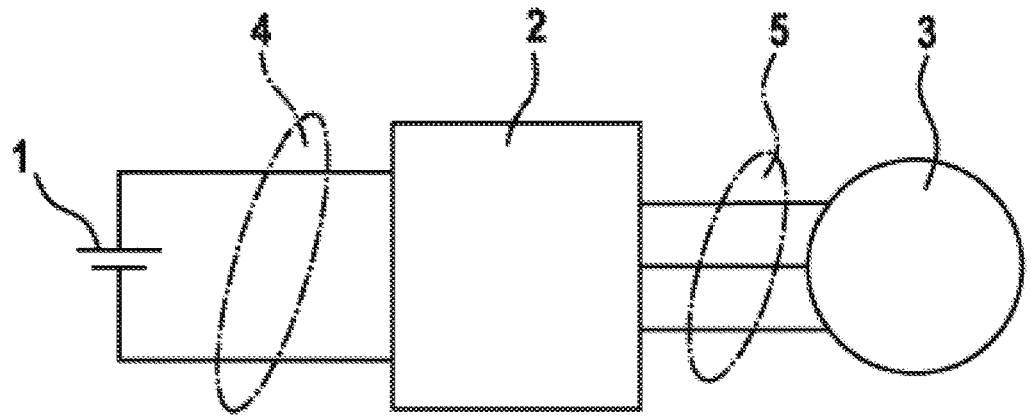
FIG. 1: shows a schematic depiction of the layout of a system consisting of a three-phase machine, battery and surge arrester, as the system underlies an embodiment of the present invention.

FIG. 1 shows a schematic depiction of a drive system for an electric or hybrid vehicle. A battery 1 supplies a direct current 4 to a pulse width modulated inverter 2. The pulse width modulated inverter 2 generates an alternating or three-phase current 5 which is used to drive the three-phase machine 3.

The three-phase machine 3 can furthermore be operated as a generator when, for example, decelerating an electric or hybrid vehicle. In so doing, the three-phase machine 3 generates an alternating or three-phase current which is converted by the pulse width modulated inverter 2 into a direct current. This direct current 4 charges the battery. The voltage at the terminals of the battery 1 varies as a function of the internal resistance of the battery 1 as well as the energy provided by the three-phase machine.

Figure 2:
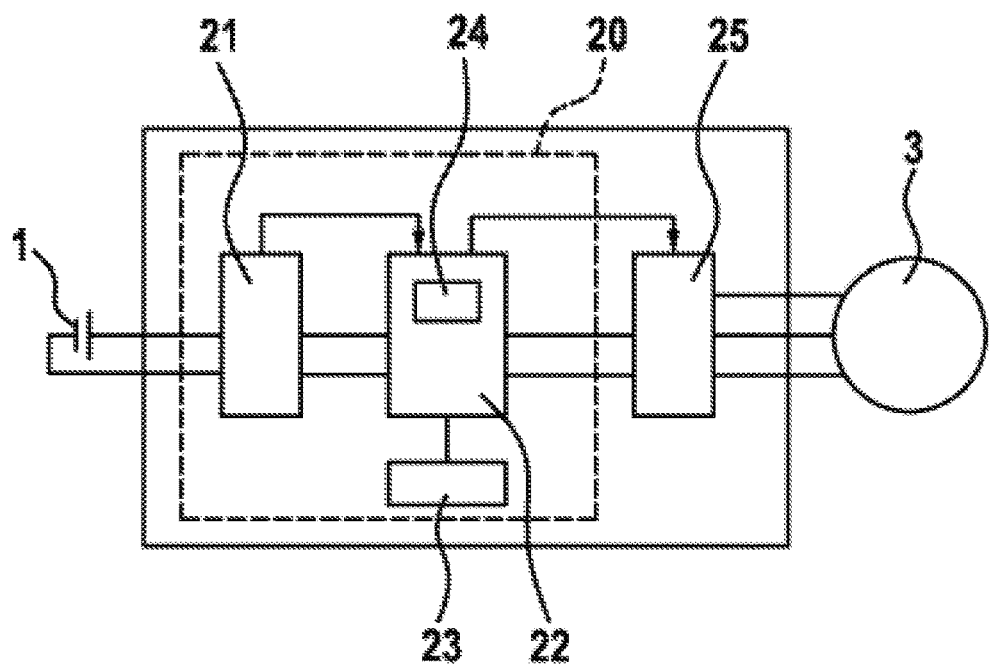
FIG. 2: shows a schematic depiction of a charge controller comprising a surge arrester according to a further embodiment of the present invention.

FIG. 2 shows a detailed depiction of a pulse width modulated inverter 2 comprising a surge arrester 20 according to one embodiment of the invention. In the generator operating mode, the three-phase machine 3 generates an alternating or three-phase current which is converted into a direct current by the power electronics 25. The battery 1 is charged with this direct current. Because the components of the power electronics 25, such as, for example, the semiconductor switches contained therein, can only be operated up to a predetermined maximum voltage upper limit, the power electronics 25 have to be protected from inadmissible excess voltages. Such excess voltages can, for example, occur as a result of the voltage rising across the terminals of the battery 1 during the charging process as a function of the internal resistance of the battery 1. The internal resistance of the battery 1 is thereby dependent on numerous parameters, such as, for example, temperature, charging current or charging condition of the battery. For that reason, a precise prediction of the terminal voltage during the charging process is not possible or only possible in a very involved manner.

The power electronics 25 must therefore be protected from dangerous excess voltages that may occur. To this end, the pulse width modulated inverter 2 comprises a first voltage detector 21 and a second voltage detector 22. The first voltage detector 21 responds when a first fixedly predetermined voltage threshold has been exceeded and thereupon completely stops the further charging of the battery 1. A charging current thus does not flow anymore into the battery and an excess voltage in the power electronics 25 is prevented.

The first voltage detector 21 is designed as independent hardware. The first voltage threshold, at which this voltage detector 21 responds, is thus fixedly predetermined by the components of the voltage detector 21 which are used. To this end, the voltage detector 21 can, for example, comprise components which very quickly go over into a conductive state when a characteristic voltage has been exceeded. Such components are, for example, so-called Zener diodes or avalanche diodes.

The pulse width modulated inverter 2 further comprises a second voltage detector 22 which likewise monitors the battery voltage and in so doing detects that a second voltage value has been exceeded. The second voltage threshold, whereat the second voltage detector 22 responds, is generally lower than the first voltage threshold, whereat the first voltage detector 21 responds. This is intended to have the effect that preferably the second voltage detector 22 responds. The second voltage detector 22 furthermore also detects that a further third voltage threshold has been exceeded at the terminals of the battery 1. This third voltage threshold is thus lower than the second voltage threshold which is likewise detected by the second voltage detector 22.

Figure 3:
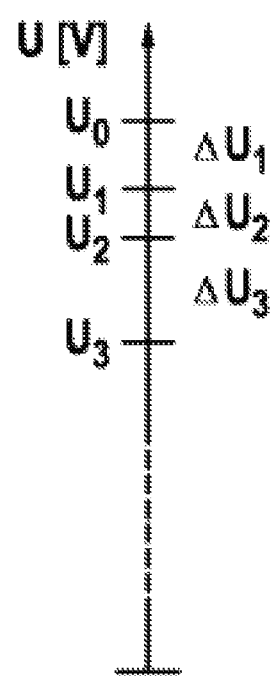
FIG. 3: shows a diagram for the schematic depiction of the voltage limits, as said limits underlie a surge arrester according to a further embodiment of the present invention.

FIG. 3 shows a schematic depiction of the relationships between the individual voltage thresholds. When seen from top to bottom, the uppermost voltage U0 denotes the maximally admissible operating voltage whereat the components of the power electronics 25 can be operated. If this maximally admissible operating voltage U0 is exceeded, this can lead to one or a plurality of the components of the power electronics 25 being damaged. This voltage U0 can therefore not be exceeded under any circumstances.

In order to reliably protect the power electronics 25 from an inadmissible excess voltage, the first voltage detector 21 is therefore adjusted such that it responds already at a first voltage threshold U1. In this case, this first voltage threshold U1 is less than the maximally admissible operating voltage U0 by a voltage difference $\Delta U1$. It is thus to be ensured that the first voltage detector 21 responds in a timely manner even under unfavorable operating conditions and that the maximally admissible operating voltage U0 is not exceeded under any circumstances.

The voltages U2 and U3 further denote the second and third voltage threshold, i.e. the voltage thresholds whereat the second voltage detector 22 responds.

As long as the terminal voltage at the battery 1 is under the third voltage threshold U3, the battery 1 is charged with a maximum possible charging current. If the second voltage detector 22 detects that the terminal voltage at the battery 1 exceeds the third voltage threshold U3 during the charging operation, the current with which the battery 1 is charged is thereupon reduced. By reducing the charging current into the battery 1, the terminal voltage at the battery 1 is also consequently reduced in correspondence with the internal resistance of the battery 1. This has consequently the result that, after the third voltage threshold U3 has been exceeded, the terminal voltage at the battery 1 only moderately rises in the further course of charging said battery.

If the terminal voltage at the battery 1 rises above the second voltage threshold U2 during the charging operation, the battery 1 is then not further charged. As a result, the charging of the battery 2 is reduced in a range $\Delta U3$ between the third voltage threshold U3 and the second voltage threshold U2 to the point where it finally is completely stopped upon reaching the second voltage threshold U2.

If however, for whatever reason, the first voltage threshold U1 that is fixedly predetermined by the first voltage detector 21 has been exceeded, the voltage detector 21 responds very quickly and thereby abruptly stops a further charging of the battery 1.

It is desirable for an optimal operation that, on the one hand, the first voltage detector 21 responds as seldom as possible; but, on the other hand, the second voltage threshold U2, whereat the second voltage detector 22 completely stops the charging of the battery 1, can be set as high as possible. To this end, the second voltage detector 22 is initially set such that the second voltage threshold U2 approximately corresponds to the first voltage threshold U1 of the first voltage detector 21, or the second voltage threshold U2 only lies slightly below the first threshold limit U1. If, for whatever reason, a response of the first voltage detector 21 is subsequently registered during the charging operation of the battery 1, the second voltage threshold U2 is then lowered. The second voltage threshold 2 can, for example, be lowered by a predetermined voltage value $\Delta U$ for each response of the first voltage detector 21. Alternative methods for adjusting the second voltage threshold U2 are furthermore likewise possible. As a result, the response voltage of the second voltage detector 22 falls for each response of the first voltage detector 21. This has the effect that the probability for a response of the first voltage detector 21 increasingly decreases in the further course of charging the battery.

It is also furthermore possible to also adjust the third voltage threshold U3, which is likewise monitored by the voltage detector 22, whenever the second voltage threshold U2 is adjusted as a result of a response of the first voltage detector 21. In this way, the voltage interval $\Delta U3$ between the second voltage threshold and the third voltage threshold can, for example, be constantly maintained. It is also alternatively possible to always leave the third voltage threshold U3 at a constant value and to only adjust the second voltage threshold U2.

By means of the gradual adjustment of the second voltage threshold U2 and, if need be, also the gradual adjustment of the third voltage threshold U3, the second voltage detector 22 can therefore be optimally adjusted. In particular, it is possible to adjust the second threshold value U2 such that the first voltage detector 21 does not respond or only very seldomly responds when the battery 1 is being charged. In this way, losses in the ride comfort of the vehicle, which are associated with the response of the first overvoltage detector, are significantly reduced. In addition, the voltage thresholds of the second voltage detector 22 are thereby adjusted such that an optimal charging of the battery 1 is ensured.

At the end of a driving cycle of an electric vehicle comprising a surge arrester according to the invention, i.e. if the electric vehicle is shutdown and the ignition is turned off, the adjusted second voltage threshold U2 and, if need be, also an adjusted third voltage threshold U3 is deposited in a storage device 23. The adjusted new voltage thresholds can therefore be read out from said storage device 23 in a succeeding driving cycle, and the second voltage detector 22 can be initiated with these voltage thresholds at the beginning of the new driving cycle.

In addition, it is possible to raise the adjusted second threshold value U2 and, if need be, also the adjusted third voltage threshold U3. If it is, for example, determined during a complete driving cycle that the first voltage detector 21 has not detected that the first voltage threshold U1 has been exceeded, the second voltage threshold U2 and also, if need be, the third voltage threshold U3 can thus be raised by a predetermined value. Alternative methods for raising the voltage thresholds U2 and U3 are likewise possible. The voltage thresholds U2 and U3 can, for example, only then be raised if a predetermined number of driving cycles have taken place without a response of the first voltage detector 21.

By means of this iterative raising and lowering of the second and also, if need be, the third voltage threshold U2 and U3, the second voltage detector 22 can be optimally adjusted to the battery in order, on the one hand, to achieve a response of the first voltage detector 21 which occurs as seldom as possible and, on the other hand, to nevertheless achieve the best possible charging of the battery 1 during the generator operating mode of the three-phase machine 3.

Whereas the first voltage detector 21 is preferably embodied as a surge arrester comprising discrete components, the second voltage detector 22 is preferably embodied as a programmable voltage detector. To this end, the terminal voltage at the battery 1 is, for example, detected by means of a voltage sensor; and the terminal voltage determined in this manner is transmitted to a control device 24. The control device 24 evaluates the terminal voltage and thereby checks whether the second or third voltage thresholds U2 or U3 have been exceeded. The power electronics 25 of the pulse width modulated inverter 2 are subsequently actuated as a function of the evaluated terminal voltage of the battery 1 such that the battery 1 is charged according to the predetermined criteria. In the process, the battery can be charged below the third voltage threshold U3 with the maximum possible charging current. The battery is charged between the second and the third voltage threshold with a reduced charging current; and the battery is no longer further charged above the second voltage threshold U2.

If the first voltage detector 21 repeatedly responds despite the adaptive adjustment of the second voltage detector 22, the system can also then permanently switch into a secure state in order to improve the ride comfort, as said secure state is adjusted after the response of the first voltage detector 21 and in which state no further charging of the battery 1 occurs. If the first voltage detector 21 frequently responds during a driving cycle or during a predetermined period of time and if, in particular, a predetermined number of responses has been exceeded, the system can permanently go into the secure state at least until the end of the current driving cycle.

The surge arrester according to the invention was described above in connection with an energy supply by means of a three-phase machine. In addition, the inventive principle can likewise be used for charging processes by means of other energy sources, such as, for example, a DC machine.

Figure 4:
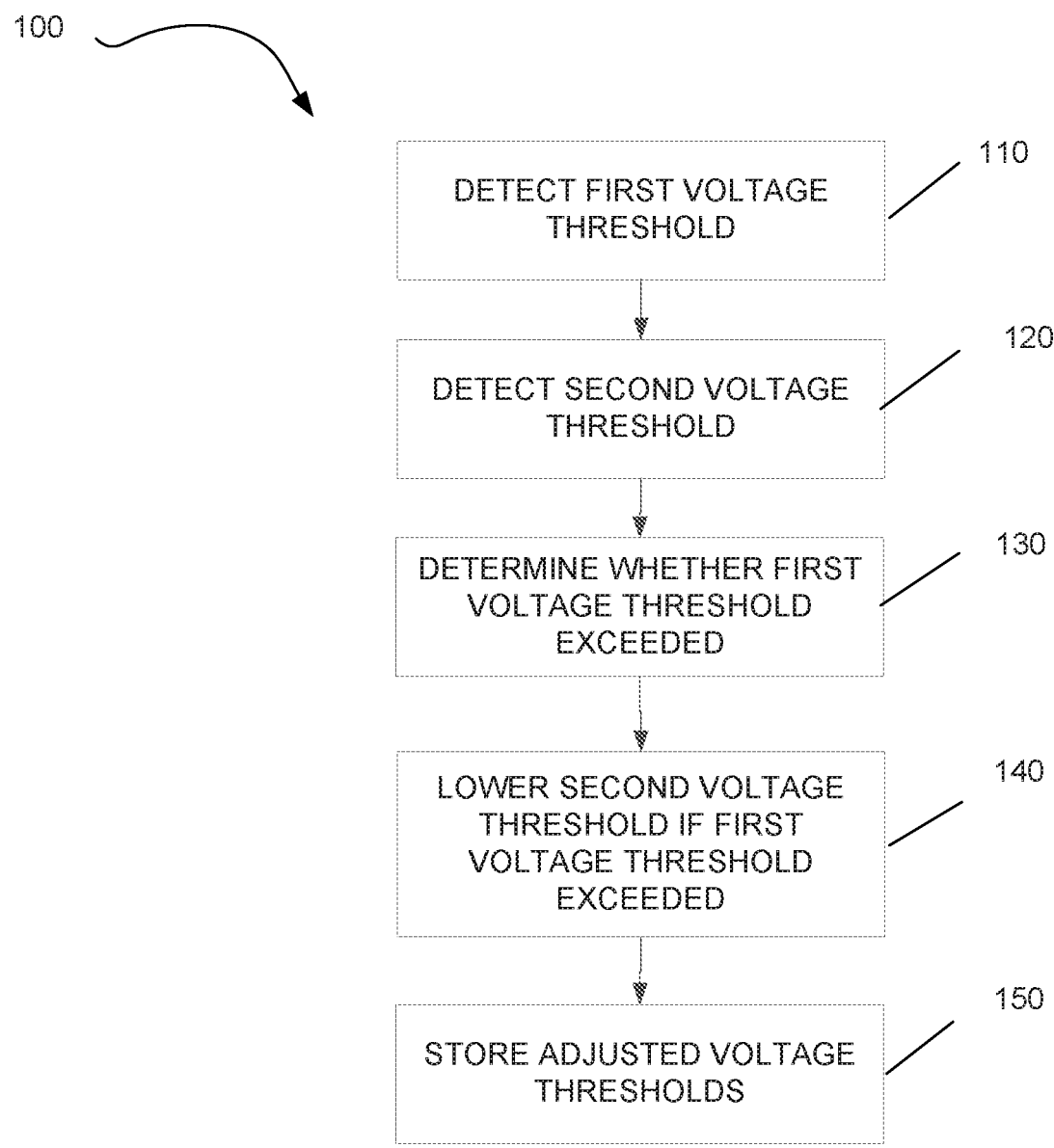
FIG. 4: shows a schematic depiction of a method for operating a surge arrester according to a further embodiment of the present invention.

FIG. 4 shows a schematic depiction of a method 100 for operating a surge arrester 20 for a charge controller, such as, for example, a pulse width modulated inverter 2. A first voltage detector 21 is initially provided in step 110. This first voltage detector 21 is designed to detect that a first voltage threshold U1 has been exceeded. In addition, a second voltage detector 22 is provided in step 120. This second voltage detector 22 is designed to detect that a second voltage threshold U2 has been exceeded and, if need be, also detect that a third voltage threshold U3 has been exceeded. Subsequently in step 130, a detection is made as to whether a first voltage threshold U1 has been exceeded. Subsequently in step 140, the second voltage threshold U2 is adapted as a function of the detection of the first voltage threshold U1 having been exceeded. To this end, the second voltage threshold U2 is lowered in response to the first threshold value U1 having been exceeded, for example by reducing the second voltage threshold U2 by a predetermined voltage value ΔU.

The method according to the invention can furthermore comprise a step 150 in which adjusted voltage thresholds are deposited in a storage device 23. In order to initialize the second voltage detector 22, for example when the vehicle is restarted, these voltage thresholds which have been deposited can be read out of the storage device 23 and the second voltage detector 22 can then be adjusted on the basis of the voltage thresholds that have been read.

The method according to the invention can also comprise a step in which the second voltage threshold U2 and also, if need be, the third voltage threshold U3 can be raised on the basis of predetermined criteria. Said third voltage threshold U3 can, for example, be raised if the first voltage detector 21 has not detected the first voltage threshold U1 having been exceeded during a predetermined period of time or during a predetermined number of driving cycles of an electric vehicle.

In summary, the present invention relates to surge arrester for a charge controller of a battery. The surge arrester comprises a first voltage detector with a fixed predetermined response threshold and a second voltage detector with an adaptively adjustable voltage threshold. The voltage threshold of the second voltage detector is adapted as a function of the response of the first voltage detector.

The invention claimed is:

1. An inverter for a charging device (2), the inverter comprising:
   power electronics configured to convert alternating current into a direct current; and
   a surge arrestor (20) receiving the direct current and including
      a first voltage detector (21) configured to detect the direct current exceeds a first voltage threshold (U1) and prevent a charging operation of the charging device (2) when the first voltage threshold (U1) is exceeded; and
      a second voltage detector (22) configured to detect the direct current exceeds a second voltage threshold (U2) and prevent the charging operation when the second voltage threshold (U2) has been exceeded, the second voltage threshold (U2) less than the first voltage threshold (U1);
   wherein the second voltage threshold (U2) is reduced by a predetermined value if the first voltage detector (21) detects that the first voltage threshold (U1) has been exceeded.

2. The inverter according to claim 1, wherein the second voltage detector (22) is configured detect that a third voltage threshold (U3) has been exceeded.

3. The inverter according to claim 2, further comprising a storage device (23) configured to store the second and the third voltage threshold (U2, U3).

4. A charging device (2) for an electrical energy storage (1) comprising an inverter according to claim 1.

5. The charging device (2) for an electrical energy store (1) comprising an inverter according to claim 4, wherein the charging device (2) is furthermore designed to reduce a charging current for the electrical energy store if the second voltage detector (22) detects that a third voltage threshold (U3) has been exceeded.

6. The charging device (2) according to claim 4, wherein the charging device (2) is supplied with electrical energy by a three-phase machine (3).

7. The charging device (2) according to claim 4, wherein the charging device (2) is supplied with electrical energy by a DC machine.

8. An electric vehicle comprising a charging device (2) for an electrical energy store (1) according to claim 4.

9. The inverter according to claim 1, further comprising a storage device (23) configured to store the second threshold (U2).

10. The inverter according to claim 2, further comprising a storage device (23) configured to store the third voltage threshold (U3).

11. A method (100) for operating an inverter for a charging device (2), comprising the steps:
   providing power electronics configured to convert alternating current into a direct current;
   providing a surge arrestor (20) receiving the direct current and including
      a first voltage detector (21) receiving the direct current and configured to detect that a first voltage threshold (U1) has been exceeded;

a second voltage detector (22) receiving the direct current and configured to detect that a second voltage threshold (U2) has been exceeded, the second voltage threshold less than the first voltage threshold;

detecting (130) that a first voltage threshold (U1) has been exceeded;

stopping a charging process of the charging device (2) when the first voltage threshold is exceeded;

stopping the charging process when the second voltage threshold is exceeded; and reducing, by a predetermined value, (140) the second voltage threshold (U2) as a function of a detection of the first voltage threshold (U1) having been exceeded.

\* \* \* \* \*